(12) United States Patent
Wang et al.

(10) Patent No.: US 8,619,766 B2
(45) Date of Patent: Dec. 31, 2013

(54) METHOD AND APPARATUS FOR CLASSIFYING PACKETS

(75) Inventors: Jia Wang, Randolph, NJ (US); Suman Banerjee, Madison, WI (US); Qunfeng Dong, Madison, WI (US)

(73) Assignees: AT&T Intellectual Property II, L.P., Atlanta, GA (US); Wisconsin Alumni Research Foundation, Madison, WI (US)

( * ) Notice: Subject to any disclaimer, the term of this patent is extended or adjusted under 35 U.S.C. 154(b) by 767 days.

(21) Appl. No.: 11/681,526

(22) Filed: Mar. 2, 2007
(Under 37 CFR 1.47)

(65) Prior Publication Data
US 2008/0212586 A1    Sep. 4, 2008

(51) Int. Cl.
*H04L 12/28* (2006.01)
*H04L 12/56* (2011.01)
*G06F 12/00* (2006.01)
*G06F 13/00* (2006.01)

(52) U.S. Cl.
USPC ............ 370/389; 370/392; 711/101; 711/122

(58) Field of Classification Search
USPC .............................. 370/392, 389; 711/1–146
See application file for complete search history.

(56) References Cited

U.S. PATENT DOCUMENTS

| | | | |
|---|---|---|---|
| 6,173,364 B1 * | 1/2001 | Zenchelsky et al. | 711/118 |
| 6,341,130 B1 * | 1/2002 | Lakshman et al. | 370/389 |
| 6,577,628 B1 * | 6/2003 | Hejza | 370/392 |
| 6,615,300 B1 * | 9/2003 | Banning et al. | 710/100 |
| 7,139,837 B1 * | 11/2006 | Parekh et al. | 709/238 |
| 7,274,700 B2 * | 9/2007 | Jin et al. | 370/392 |
| 7,367,052 B1 * | 4/2008 | Desanti | 726/3 |
| 2003/0026246 A1 * | 2/2003 | Huang et al. | 370/352 |
| 2004/0085958 A1 * | 5/2004 | Oman | 370/389 |
| 2004/0105422 A1 * | 6/2004 | Sahni et al. | 370/351 |
| 2004/0205292 A1 * | 10/2004 | Lu | 711/108 |
| 2004/0221108 A1 * | 11/2004 | Bianchi et al. | 711/131 |
| 2008/0084866 A1 * | 4/2008 | Johnson et al. | 370/351 |

OTHER PUBLICATIONS

Singh et al., Packet Classification Using Multidimensional Cutting, Aug. 2003, SIGCOMM 2003, pp. 1-12.*
Q. Dong, et al., "Wire Speed Packet Classifications Without TCAMs: A Few More Registers (and a Bit of Logic) Are Enough", SIGMETRICS '07, Jun. 12-16, 2007, San Diego, California, copy consists of 12 unnumbered pages.

* cited by examiner

*Primary Examiner* — Un C Cho
*Assistant Examiner* — Jeremy Costin (57) ABSTRACT

A method and apparatus for classifying packets, e.g., at wire speed are disclosed. The method receives a packet and processes the packet through a hardware-based packet classifier having at least one evolving rule. The method then processes the packet through a software-based packet classifier if the hardware-based packet classifier is unable to classify the packet. In one embodiment, the at least one evolving rule is continuously modified in accordance with learned traffic characteristics of the received packets.

13 Claims, 11 Drawing Sheets

METHOD AND APPARATUS FOR CLASSIFYING PACKETS

The present invention relates generally to packet processing, and in particular, to a method and apparatus for classifying packets.

BACKGROUND OF THE INVENTION

As more and more services are being provided on Internet Protocol (IP) based networks, the IP network's quality of service and security have become critical. One of the factors that affect the Quality of Service (QoS) and security is packet classification. Packet classification may involve matching incoming packets against a set of rules defined over one or more packet header fields, and determining one or more decisions (actions). For example, a router may classify one or more received packets to determine whether or not the received packet(s) should be permitted to pass through a router. Traditionally, packet classification can be performed in software using fast network processors, with a Static Random Access Memory (SRAM) or a Dynamic Random Access Memory (DRAM). However, packet arrival rate (wire-speed) is increasing dramatically with the growth of the Internet. Despite the use of fast network processors, there is a widening gap between the packet arrival rate and memory access speeds for SRAM and DRAM. Hence, software-based packet classification is not able to provide classification at wire-speed. Another approach is a hardware-based solution to classify packets at wire-speed using Ternary Content Addressable Memory (TCAM). However, TCAM is an expensive and complex technology. Moreover, as wire speeds and rule sets increase, pure TCAM-based solutions will become increasingly more expensive.

Therefore, there is a need for a method and apparatus that provide efficient packet classification.

SUMMARY OF THE INVENTION

In one embodiment, the present invention discloses a method and apparatus for classifying packets, e.g., at wire speed. The method receives a packet and processes the packet through a hardware-based packet classifier having at least one evolving rule. The method then processes the packet through a software-based packet classifier if the hardware-based packet classifier is unable to classify the packet. In one embodiment, the at least one evolving rule is continuously modified in accordance with learned traffic characteristics of the received packets.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for classifying packets, e.g., at wire speed. Although the present invention is discussed below in the context of Internet Protocol (IP) networks, the present invention is not so limited. Namely, the present invention can be applied to any packet based network e.g., cellular networks, Asynchronous Transfer Mode (ATM) networks, etc. For the purpose of scope, the term packet is intended to broadly include a data unit of any size or type, e.g., a record and the like.

Packet classification may involve matching incoming packets against a set of rules defined over one or more packet header fields, and determining one or more decisions (actions). For example, a router may classify one or more received packets to determine whether or not the received packet(s) should be permitted to pass through a router. However, despite the use of fast network processors, software based packet classification performs poorly when packet classification must be performed at wire-speed, whereas a hardware-based packet classification implementation is very expensive. Therefore, there is a need for an efficient method and apparatus for providing packet classification.

In one embodiment, the present invention provides packet classification, e.g., at wire speed, by using a smart rule cache for storing rules that will evolve based on the characteristics of the incoming traffic. In one embodiment, packet classification is performed against one or more rules stored in a cache memory. In order to better describe the present invention, the following networking terminologies will first be provided:

Packet classification;
Rule set;
Projection of a packet;
Flow;
Flow cache;
Rules cache; and
Standard Packet Decision Diagram (SPDD).

Packet classification refers to differentiation of packets based on packet header fields. For example, packet classification involves matching each incoming packet against a rule set as defined below.

A rule set refers to a set of rules defined over one or more packet header fields. For example, for each of the packet header fields F, a rule specifies a literal given in the general form of F∈[a,b] and a decision for a packet that matches the rule. For example, a literal for a source port may specify the source port number to be in the range [5001, 65535]. A decision may be specified as "deny" if a packet that matches the rule is classified as "unwanted" traffic. Some examples of commonly used literals that specify the range [a,b] are: single values, prefixes, and the entire domain of field F represented by a wildcard.

Mathematically defined, a rule set is an ordered set R={$r_1$, $r_2 \ldots, r_n$} of rules. Each rule r, is composed of two parts: a predicate and a decision (or action). The predicate is a conjunction of d literals defined over d packet header fields. Each literal may be written as a range literal $F_j \in [l_j, h_j]$, where $F_j$ denotes a packet header field. A rule $r_i$ defined over d packet header fields may then be written as $$r_i : \bigwedge_{j=1}^{d} (F_j \in [l_j, h_j]) \to \text{decision}.$$

The projection of a packet refers to the d-tuple comprising of the packet's d header fields specified in the rule set.

A flow refers to a set of all packets with the same projection.

A flow cache scheme refers to a scheme in which a cache is used to store the projections and decisions of recently observed packets with the expectation of speeding up the classification of succeeding packets with the same projection.

A rules cache refers to a scheme in which a cache is used to store classification rules instead of recently observed flows.

A Standard Packet Decision Diagram (SPDD) f of a rule set defined over packet header fields $F_1, F_2, \ldots, F_d$ is a directed tree that has the following properties:

Each node v in f has a label F(v). If v is a leaf node, F(v) specifies an action. If v is an internal node, F(v) specifies a packet header field;

Each internal node v has a set E(v) of outgoing edges pointing to its children and only one incoming edge from its parent. Each edge $e \in E(v)$ has a label l(e), which denotes a non-empty subset of the domain of field F(v). In general, l(e) may be represented as a set of non-overlapping ranges. For any two edges, $e \neq e'$ in E(v), $l(e) \cap l(e') = \Phi$. Meanwhile, $\bigcup_{e \in E(v)} l(e)$ is the entire domain of the packet header field F(v) (denoted by D(F(v)). Namely, the labels of v's outgoing edges form a partition of D(F(v)); and On the path from the root to any leaf node (which is referred to as a decision path), there are exactly d internal nodes. The label of the $i^{th}$ internal node denotes the $i^{th}$ packet header field $F_i$, i.e., the $i^{th}$ dimension of the d-dimensional space. Notice that the label of the leaf node denotes the decision. The decision path, denoted by $v_1 e_1 v_2 e_2 \ldots v_d e_d v_{d+1}$, represents the rule $$\bigwedge_{i=1}^{d} (F_i \in l(e_i)) \to F(v_{d+1}).$$

In one embodiment, the predicate of each rule specifies a literal on each of the following five packet header fields: source IP address, destination IP address, source port, destination port, and type of protocol. A rule and a packet are considered to match if the conjunctive predicate of the rule is evaluated to be true on the projection of the packet. When matching a packet against a rule, each literal in the rule is evaluated on the corresponding packet header field. If every literal evaluated is true, then the rule is considered to match the packet. If a rule is the first rule in the rule set that matches a packet, the action it specifies is performed on the packet.

Note that, either explicitly or implicitly, rule sets may contain a default rule that matches every incoming packet. For example, if none of the preceding rules matches a packet, the action of the default rule is performed on the packet. Thus, each rule set covers the entire d-dimensional space defined over the d packet header fields specified in that rule set. The domain of each dimension is the domain of the corresponding packet header field. For example, the dimension corresponding to the 32-bit source IP address field has a domain of [0, $2^{32}-1$], while the dimension corresponding to the 16-bit destination port field has a domain of [0, $2^{16}-1$]. Within the d-dimensional space, the conjunctive predicate of each rule delimits a d-dimensional hypercube, which is referred to as the definition region of the rule.

One method for visualizing the decision of a rule is as a "color" that colors the definition region of that rule. For simplicity, that may be referred to as "the color of that rule." A rule set then defines a coloring of the d-dimensional space, which may be referred to as the semantics of the rule set. The projection of a packet or a flow may be viewed as the coordinate of a specific point in the d-dimensional space. Each point in the d-dimensional space may be contained in the definition region of multiple rules. The color of a point is defined to be the color of the first rule whose definition region contains that point.

In a network environment, routers observe millions of concurrent flows with frequent updates. On the contrary, the number of rules in a rule set is far fewer and the rules change less frequently. Hence a large flow cache with frequent updates is needed to classify packets using flow cache scheme. On the contrary, a rule cache with very few rules (e.g. one or two rules) may be used to classify a large number of flows. That is, a very small number of rules may be designed to match most of the incoming traffic such that a greater percentage of the packets are classified using the cache.

Table-1 illustrates an exemplary rule-set with 4 rules. There are: two fields $F_1$ and $F_2$; and two actions permit and deny.

TABLE 1

Exemplary rule-set

| | |
|---|---|
| Rule I: | ($F_1 \in [30, 70]) \wedge (F_2 \in [40, 60])$ → permit |
| Rule II: | ($F_1 \in [10, 80]) \wedge (F_2 \in [20, 45])$ → permit |
| Rule III: | ($F_1 \in [25, 75]) \wedge (F_2 \in [55, 85])$ → permit |
| Rule IV: | ($F_1 \in [0, 100]) \wedge (F_2 \in [0, 100])$ → deny |

Figure 1:
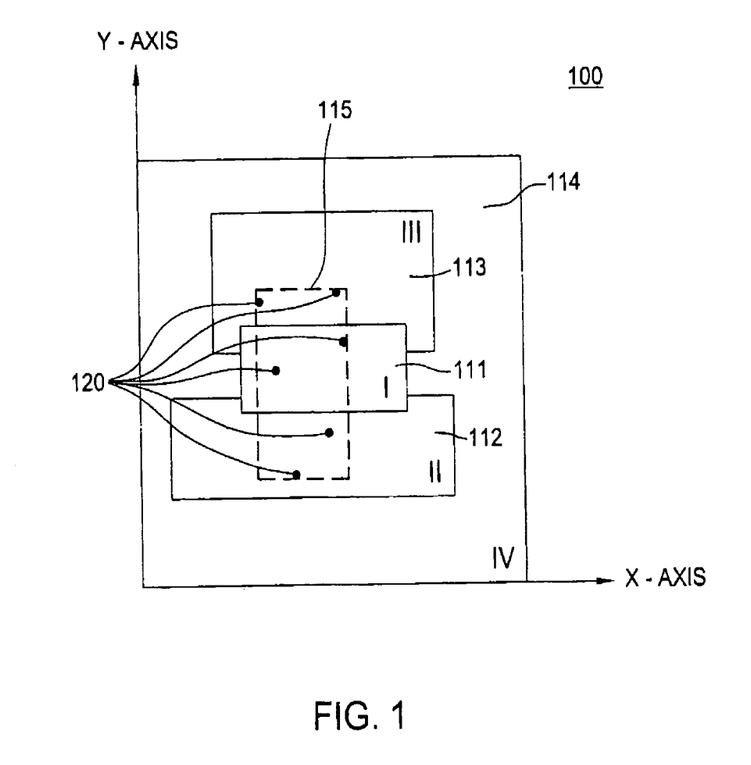
FIG. 1 illustrates a rule set with four rules.

FIG. 1 illustrates the rule set with four rules, as shown in Table-1. The two fields, $F_1$ and $F_2$, are represented along X- and Y-axes, respectively. The boxes 111, 112, 113 and 114 correspond to rules I, II, III and IV, respectively. The shaded boxes 111, 112 and 113 correspond to rules whose action is permit. In this illustrative example, there are six flows, each represented by a dot 120. Each of the rules I, II, and III matches two flows. Thus, caching the 3 rules instead of the 6 flows is more efficient. Observe that a new rule may be constructed to match the 6 flows in FIG. 1. For example, a new rule may be Rule-X: ($F_1 \in [32, 55]) \wedge (F_2 \in [32, 68])$→permit as illustrated by the dashed box 115. The new single rule is able to match all the flows and execute the same action. Thus, caching this single rule is adequate in this illustrative example.

Figure 2:
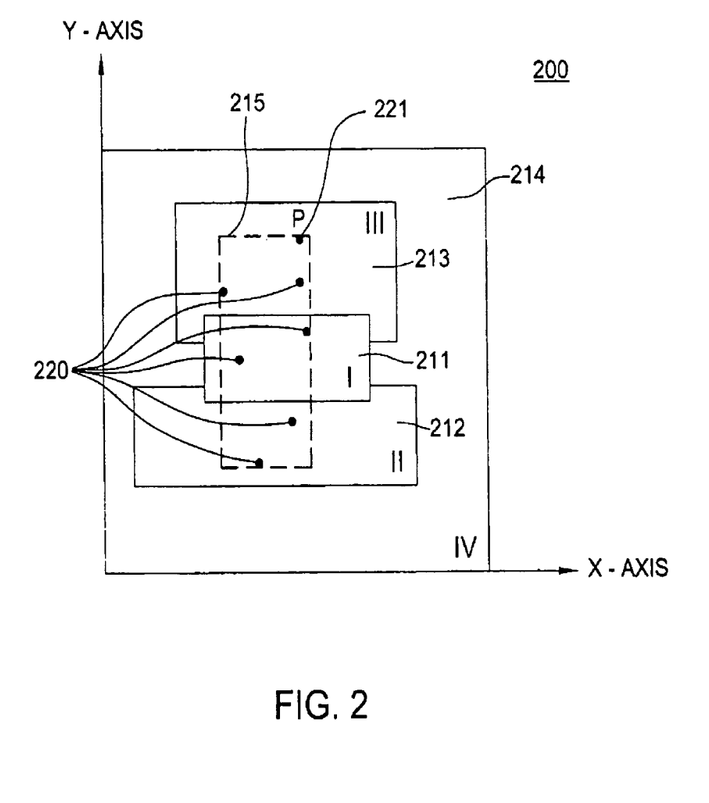
FIG. 2 illustrates a rule set with a subsequent flow.

FIG. 2 illustrates the rule set with 4 rules, as shown in Table-1, with a subsequent (seventh) flow. The boxes 211, 212, 213 and 214 correspond to rules I, II, III and IV, respectively. The shaded boxes 211, 212 and 213 correspond to rules whose action is permit. There are seven flows; the six previous flows represented by a dot 220, and the seventh (new flow) represented by a dot 221. Only rule III matches the new flow. Note also, Rule-X as illustrated in FIG. 1 does not match this flow. However, a new rule may be constructed as Rule-Y: $(F_1 \in [32, 55])^\wedge (F_2 \in [32, 80]) \rightarrow$ permit. Rule-Y is illustrated by the dashed box 215. Thus, the new rule matches all 7 flows. As such, by evolving the cached rule from Rule-X to Rule-Y (based on incoming traffic pattern), a greater fraction of the incoming traffic may be classified using a single rule. In one embodiment of the present invention, the present invention constructs rules that match most of the traffic volume instead of caching rules exactly as specified in a rule set. For example, instead of caching rules I, II, III and IV, the current invention may cache Rule X and/or Rule Y. The new rules are based on the rule set, but may not be identical to any rule in the rule set. Moreover, the new rules evolve over time to reflect changing patterns in incoming traffic. The process of modifying rules to reflect changes in traffic pattern is referred to as rule evolution. For example, the cached rule may be evolved from Rule X to Rule Y.

Note that all flows that do not match the current cached rules need to be matched against the original set of rules in the packet classifier. For example, if a flow is not successfully classified using Rule X or Rule Y, it is then classified using the original set of rules I, II, III and IV. The benefit of the rule caching scheme will be increased if most of the traffic matches the cached rules, and only a very small fraction of traffic needs to be matched against the original rule set. In order to take greater advantage of the cached rules scheme, in one embodiment, the current invention classifies packets using a rule cache with classification being performed in two stages: a hardware-based rule cache stage; and a software-based full packet classification stage (e.g., executed by a processor).

Figure 3:
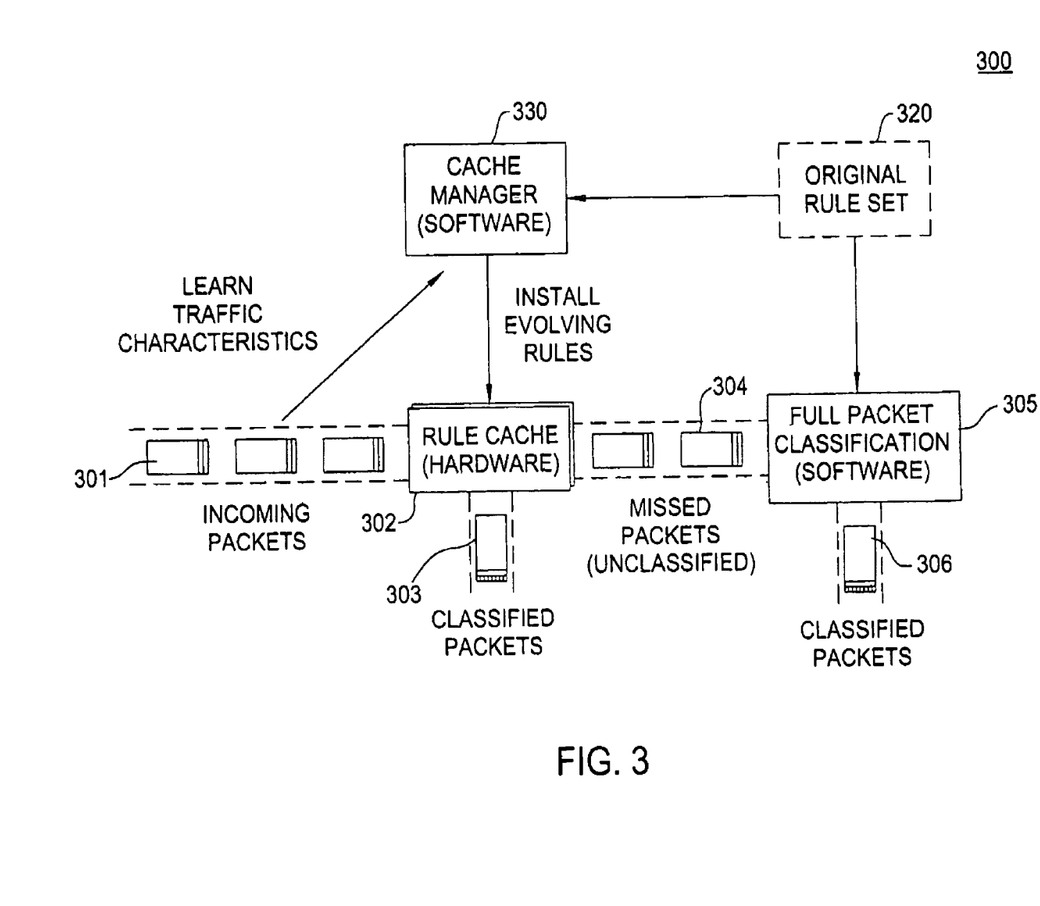
FIG. 3 illustrates a system for performing packet classification.

FIG. 3 illustrates a system 300 for performing packet classification. In one embodiment, the system 300 contains a hardware-based rule cache 302, a software-based full packet classifier 305, a cache manager 330, and an original rule set 320, e.g., comprising a set of classification rules. In operation, incoming packets 301 are processed by rule cache 302 for packet classification. The rule cache 302 separates successfully classified packets 303 from unclassified packets (e.g., cache missed packets) 304. The cache missed packets 304 are then forwarded to full packet classifier 305. Actions, e.g., permit or deny, are then performed on classified packets 303 and 306. The full-fledged packet classifier 305 is only used in the event of cache misses, i.e., where the rules stored in the rule cache are not able to properly classify the received packets.

In one embodiment, the rule cache 302 contains a small number of on-chip cache entries with each storing an evolving rule. Each cache entry comprises of a register storing the evolving rule and a logic for matching incoming packets against the stored rule. The cache entries are designed to process and match each incoming packet in parallel, synchronized with the network processor. That means, the rule cache 302 is designed to report either a cache miss or a decision on the packet in a single network processor cycle. In one embodiment, the projection of the incoming packet is input to all cache entries simultaneously. The cache entries are used to match the incoming packet in parallel and simultaneously report their matching result. The parallel outputs of the results are input into a bitwise OR logic to yield the final output of the rule cache. Since the number of cache entries is limited to a small number, a small rule cache may be implemented in network processors at negligible cost. Then, synchronized with the network processor, the rule cache is able to output its matching result within one network processing cycle. Furthermore, cache update to the rule cache 302 can be performed by re-writing its register entries that are carrying the evolving rules.

In one embodiment, the current invention uses two identical rule caches to achieve seamless hot-swap to avoid cache management delay. The two rule caches may be controlled using a 0/1 switch that directs incoming packets to the functioning cache automatically while the cache being updated is disabled.

In one embodiment, the cache manager 330 manages the rule cache 302 such that the cache miss is reduced. In other words, the cache manager evaluates cache hit performance by placing the pertinent rules into the rule cache 302 and dynamically evolves those rules in response to patterns of incoming traffic 301 and the content of the original rule set 320.

In one embodiment, the cache manager 330 may collect sample packets to determine traffic characteristics of incoming traffic 301. Namely, the cache manager may ignore the incoming traffic during cache management, and determines traffic characteristics from processed packets. More specifically, to evolve the rules to capture missed flows, the cache manager needs to sample missed packets 304.

In one embodiment, the present invention collects sample packets after cache management is completed on the packets such that the sample packets are selected from packets that result in cache miss. For example, after cache management is completed, the method waits for a fixed number of packets (referred to as a sampling interval) before collecting the next sample packet. If some packets during the sampling interval result in cache misses, the method takes some of those packets as sample packets and restarts cache management for evolving the rules. Reducing the cache miss reduces the workload on the full-fledged packet classifier, which in turn may shorten packet classification delays experienced by missed packets that are processed by the full packet classifier.

In one embodiment, the cache manager determines relevant statistics on the sample packets stored in a sliding window, which contains the most recent W sample packets. W is defined as the sliding window size. In particular, the cache manager determines all distinct flows and their associated frequencies in the sliding window. The frequencies associated with the flows are also referred to as flow weights. The cache manager uses the statistics of the flow weights to maintain a list of evolving rules, and to determine which rules should be switched into or out of the rule cache in order to maximize cache hit ratio.

Note that the rules stored in the rules cache are consistent with the original rule sets of the full packet classifier in terms of semantics. In order to facilitate the verification of this semantic integrity, the rule sets may be represented using an efficient data structure.

In one embodiment, the cache manager uses a data structure called regular hyper-cube list (RHL). Each RHL element is an evolving rule to be placed into the rule cache. In one embodiment, the RHL possesses the following four properties:

1. Each RHL element represents an evolving rule whose definition region is a d-dimensional hyper-cube. This "hyper-cube" is also referred to as an "evolving rule", or an "RHL element."
2. Each hyper-cube is colored by one color in the coloring of the d-dimensional space defined by the rule set such that each evolving rule may be stored in a single entry in the rule cache, without violating semantic integrity. That is, if a cached rule matches an incoming packet, it is guaranteed that its decision on the packet is the same as the decision that the original rule set would take on that packet.

3. Each sample packet in the sliding window is assigned to one evolving rule that contains it in the d-dimensional space. This property guarantees that sampled information in the sliding window can be made completely available in cache by caching the entire RHL. The weight of each evolving rule is defined to be the number of sample packets in the sliding window that are assigned to it. To keep track of the assignment of sample packets to evolving rules, the method adds a pointer to each sample record pointing to the evolving rule it is assigned to.

4. Evolving rules either have the same action or are non-overlapping. This rule guarantees that if two or more evolving rules match the same packet (which means they overlap), they must have the same decision.

The data structure of an evolving rule stores its range along each dimension, color, weight, cache entry index (if it is in cache) and its current position in the RHL (for use in cache management). The RHL elements are sorted in non-increasing order of weight. Assume the rule cache comprises of m entries. Then the fourth property as discussed above allows the method to cache the first m elements of the RHL. In cache management, the method assumes and ensures that the cache contains the topmost elements of the RHL.

Once the data structure is defined, the cache manager maintains the structure while packets are being received, processed, classified and sampled. After obtaining a new sample packet, the cache manager performs a series of operations to update the relevant data structures and the rule cache. The series of operations in cache management are deleting the oldest sample and inserting the new sample while maintaining the data structure and its properties.

In one embodiment, the present invention deletes the oldest sample when a new sample packet is obtained by first removing the oldest sample packet from the sliding window. The method follows its pointer to the evolving rule H it is assigned to and decrements the weight of H by one. If the weight of H comes down to zero, it is removed from the RHL. If H is currently in the cache, its cache entry is replaced with the first evolving rule H' that is currently not in the cache (if such an H'exists). If the weight of H is still positive, the method moves H towards the tail of the RHL until the weight of its successor (if any) is no larger than its own weight. If H is originally in cache (i.e., top m in the RHL) but not top m in the RHL after position adjustment, the method places the new mth evolving rule H' into the cache entry of H. This can be done when adjusting the position of H, by maintaining Hs current position in the RHL. In particular, when moving H toward the tail of the RHL, if His currently the mth element and is about to switch with the (m+1)th element, the method places the (m+1)th element into the cache entry of H.

Insertion of the new sample is performed by appending the new sample packet to the tail of the sliding window. The method then checks through the RHL to find the first evolving rule H that contains the new sample packet.

If such an H is found, its weight is incremented by one and the method assigns the new sample packet to H. To keep the RHL sorted by weight, the method moves H toward the head of the RHL until the weight of its predecessor is no less than its own weight. If H is currently not in the cache but ranks top m in the RHL after position adjustment, the method places H into the cache entry of the new (m+1)th evolving rule. This can be similarly done by maintaining Hs current position in the RHL. When moving H toward the head of the RHL, if H is currently the (m+1)th element and is about to switch with the mth element H', the method places H into the cache entry of H'.

If none of the evolving rules already contains the new sample packet, the method obtains an evolving rule that contains the new sample packet in order to preserve the $3^{rd}$ property as discussed above. There are two possible ways to achieve that: expanding an existing evolving rule or creating a new evolving rule. In one embodiment, the method covers the sample packet using as few evolving rules as possible such that a small cache may cover as many incoming flows as possible. Therefore, the method goes through the RHL and checks each evolving rule to see if it can be expanded to contain the new sample packet while preserving the $1^{st}$, $2^{nd}$ and $4^{th}$ properties. If none of the existing evolving rules can be expanded, the method creates a new evolving rule containing exactly the new sample packet and appends it to the tail of the RHL.

In one example, a hyper-cube H is expanded to cover a new point p while preserving the $1^{st}$ property as follows: First, assume on the Ah dimension, the range of H is denoted by $[I_i, h_i]$ and the coordinate of p is $x_i$. If $x_i < I_i$, the method decreases $I_i$ to $x_i$. If $x_i > h_i$, the method decreases $h_i$ to $x_i$. If $x_i \in [I_i, h_i]$, and there is no need to expand H along the Ah dimension. Verifying whether or not the expanded H (denoted by H') satisfies the $4^{th}$ property is performed by going through the RHL and checking each evolving rule to see whether it overlaps with H' but has a different color from H'. Now it only remains to verify whether H' satisfies the $2^{nd}$ property. This may be done using the Standard Packet Decision Diagram (SPDD) of the rule set. First, recall that the leaf nodes of an SPDD form a partition of the entire d-dimensional space and define a coloring that is consistent with the semantics of the rule set. Therefore, the $2^{nd}$ property is preserved if and only if all the leaf nodes overlapping with H' have the same color as H'. This can be verified by traversing the SPDD and checking the color of each leaf node overlapping with H'. However, this approach may take a long time and hence result in a long cache management delay.

In one embodiment, the current method uses an efficient data structure called Pruned Packet Decision Diagram (PPDD). The method provides an optimization technique and an algorithm for trimming the SPDD to obtain a PPDD. In other words, given a rule set, the PPDD of the rule set is determined by trimming its Standard Packet Decision Diagram (SPDD).

Figure 4:
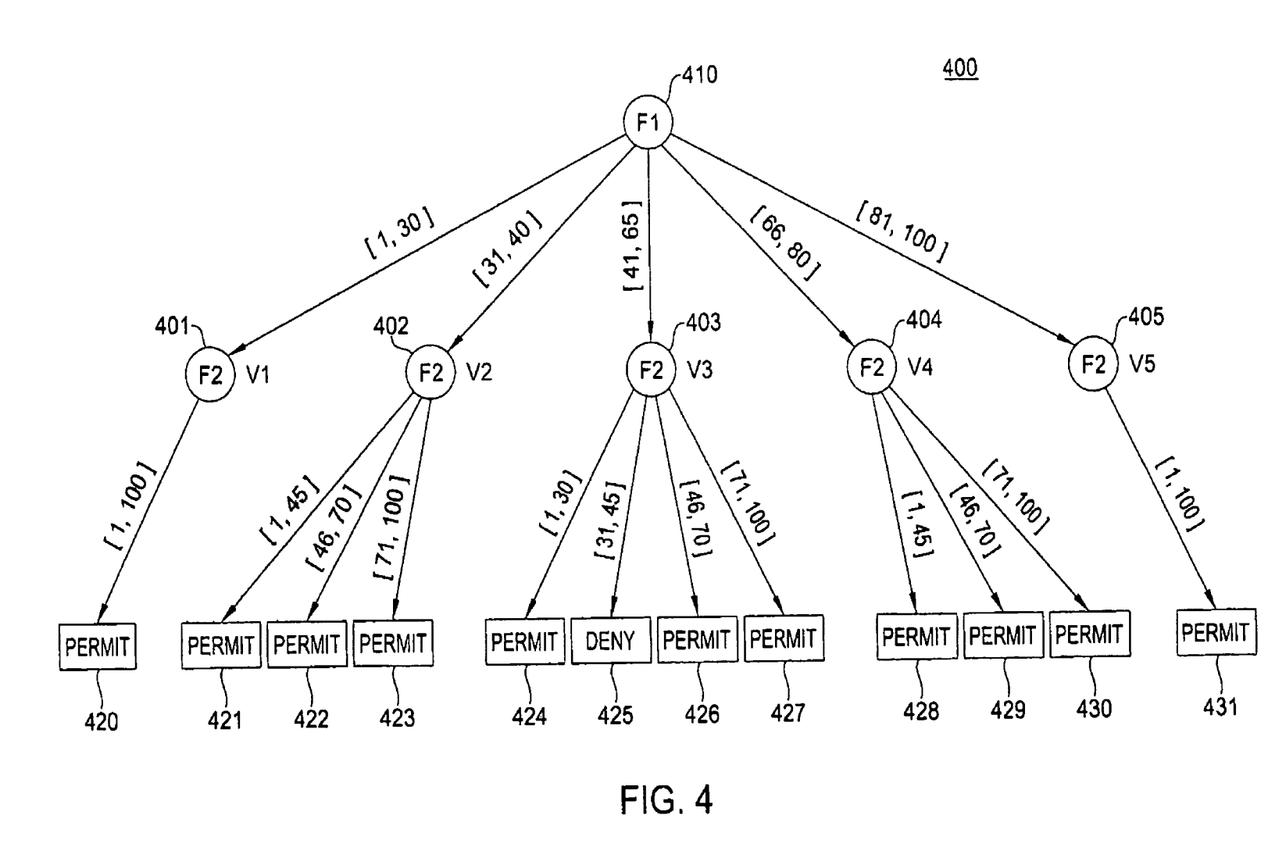
FIG. 4 illustrates the SPDD of the rule set in Table-2 with each edge denoting a single range.
Figure 5:
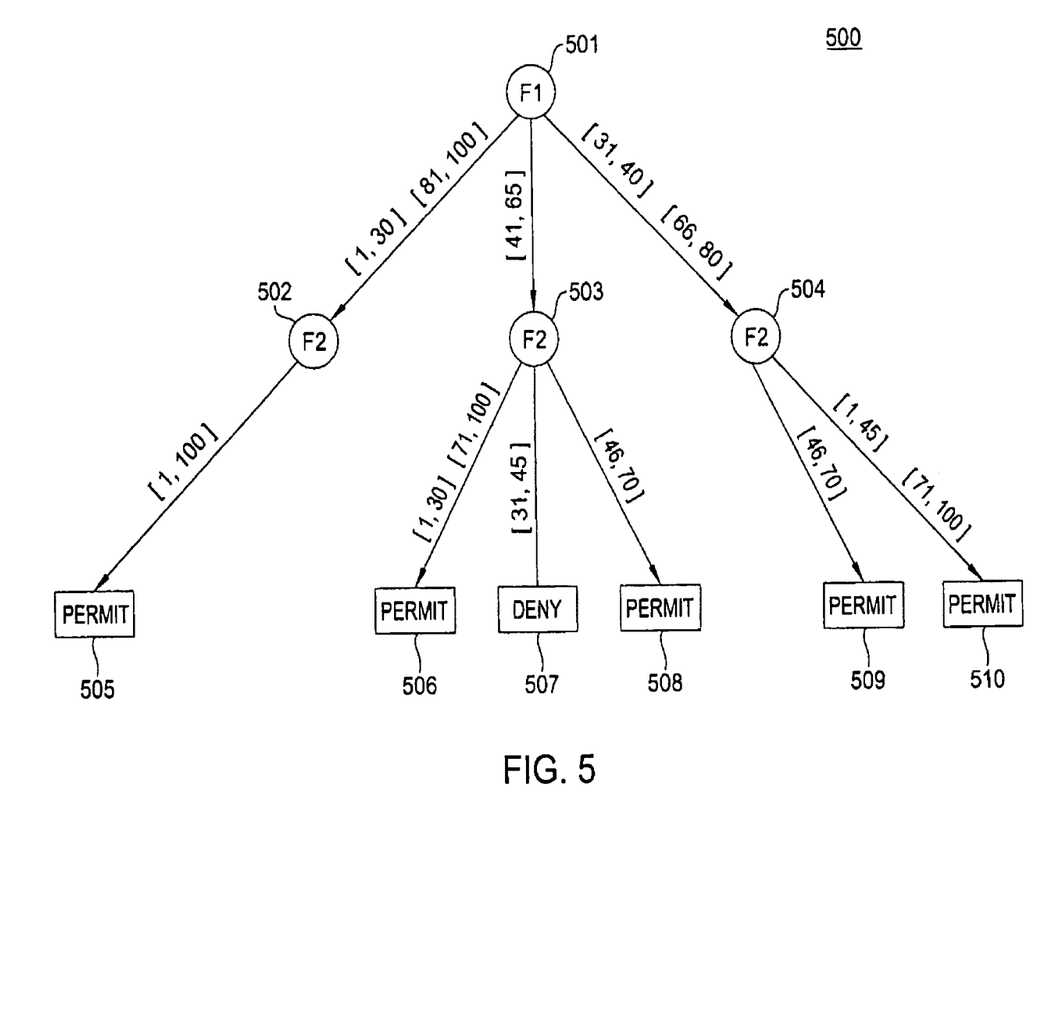
FIG. 5 illustrates the SPDD of the rule set in Table-2, with edges denoting one or more ranges.

Table-2 illustrates an example of a rule set with three rules. FIG. 4 illustrates a SPDD 400 of the rule set in Table-2 with each edge denoting a single range. FIG. 5 illustrates a SPDD 500 of the rule set in Table-2, with edges denoting one or more ranges. Compared to the SPDD in FIG. 5, the regular form of SPDD in FIG. 4 possesses the property that the label of each edge denotes a single range. Note that FIG. 4 used 18 nodes 401-431. By using multiple ranges for the edges, FIG. 5 provides the same information provided in FIG. 4 with only 10 nodes 501-510. In order to clearly describe the SPDD in FIG. 5, first examine the more regular form of SPDD 400 shown in FIG. 4. For simplicity, the description below refers to the regular form of SPDD with each edge denoting a single range as "SPDD." The trimmed versions are described later.

TABLE 2

An example of a rule set

| | |
|---|---|
| $r_1$: | $(F_1 \in [31, 80]) \wedge (F_2 \in [46, 70]) \rightarrow$ permit |
| $r_2$: | $(F_1 \in [41, 65]) \wedge (F_2 \in [31, 50]) \rightarrow$ deny |
| $r_3$: | $(F_1 \in [1, 100]) \wedge (F_2 \in [1, 100]) \rightarrow$ permit |

Let $F_i$ denote the $i^{th}$ dimension of the d-dimensional space. In general, each node $v_i$ in a decision path $v_1e_1v_2e_2 \ldots v_de_dv_{d+1}$ may be viewed as representing the d-dimensional hypercube:

$$H_{v_i} = \left(\bigwedge_{j=1}^{d} (F_j \in I(e_j))\right) \wedge \left(\bigwedge_{j=1}^{d} (F_j \in D(F_j))\right).$$

In the description below, "node V" and "the hyper-cube represented by node v" are used interchangeably for ease of presentation. For any internal node v, shown as 401-405 in the SPDD, v's children form a partition of $H_v$. Furthermore, all the leaf descendants of v also form a partition of $H_v$. As a special case, all the leaf nodes 420-431 in the SPDD form a partition of the entire d-dimensional space, which is represented by the root node 410 of the SPDD. Each leaf node is labeled with a decision. Together, all the leaf nodes 420-431 define a coloring of the d-dimensional space, which is consistent with the semantics of the rule set.

Given the semantic integrity of SPDD, any packet may be classified by checking through a decision path from the root 410 to some leaf node in 420-431. At the $i^{th}$ internal node $v_i$ on the path, the method follows the outgoing edge whose label contains the value of field $F_i$ in the packet header. Let δ denote the number of ranges denoted by the outgoing edges. The number of memory accesses needed to pick the right outgoing edge is bounded by O(δ). The number of memory accesses needed to classify a packet is thus bounded by O(dΔ), where Δ is the maximum δ value over all nodes in the SPDD. In the regular form of SPDD, Δ is the maximum fan-out of any node in the SPDD. As the size of SPDD can be potentially large for large rule sets, the current invention trims the SPDD of a rule set to obtain its PPDD. The PPDD preserves the semantic integrity of SPDD but contains fewer and shorter decision paths. PPDD may then be used to classify each incoming packet. Note that computing and optimizing the PPDD is a one-time pre-processing task before packet classification. The PPDD remains valid throughout the packet classification process until the semantics of the rule set has changed. In practice, rule sets are not frequently modified and time spent on building the PPDD is of little concern for packet classification performance.

In one embodiment, the current method decreases the number of SPDD nodes to be visited to verify compliance with the $2^{nd}$ property by employing various early detection techniques. The first early detection technique assumes the method is currently at node u in the SPDD. For each child v of node u, the method explores the sub-tree rooted at v (denoted by $T_v$) only if $H_v$ overlaps with the expanded hyper-cube H'. Because V's leaf descendants form a partition of $H_v$. If $H_v$ does not overlap with H', none of v's leaf descendants can overlap with H'. Therefore, there is no need to explore $T_v$.

For example, assume H' is defined by $(F_1 \in [45, 70]) \wedge (F_2 \in [35, 45])$. In the example SPDD in FIG. 4, there is no need to explore the sub-trees rooted at $v_1$, $v_2$ and $v_5$, since those sub-trees cannot contain any leaf node overlapping with H'.

Now suppose $H_v$ overlaps with H' and hence the method may need to explore $T_v$. There are two early detection techniques that may be employed to further avoid exploring $T_v$. First, if $H_v$ is colored by a single color that is the same as H', the method can determine without exploring $T_v$ that $T_v$ cannot contain any leaf node with a color different from H'. For example, assume that H is defined by $(F_1[45, 60]) \wedge (F_2 \in [10, 25])$ with decision permit and the expanded H' is defined by $(F_1[25, 60]) \wedge (F_2 \in [10, 25])$ with the same decision. In the example of the SPDD in FIG. 4, there is no need to explore $T_{v1}$, and $T_{v2}$, since $H_{v1}$, and $H_{v2}$ are both colored by the same single color permit.

Second, if $H_v$ is colored by a single color that is different from H', then $T_v$ must contain some leaf node that overlaps with H' and has a different color from H'. Thus, the method can immediately fail the verification of the $2^{nd}$ property without exploring $T_v$. For example, assume that H' is defined by $(F_1 \in [45, 60]) \wedge (F_2 \in [35, 45])$ with decision deny and H' is defined by $(F_1 \in [45, 70]) \wedge (F_2 \in [35, 45])$ In the example SPDD in FIG. 4, the method can immediately fail the verification of $2^{nd}$ property without exploring $T_{v4}$, since $H_{v4}$, is colored by a single color permit that is different from H'.

The above two early detection techniques require some additional information: for each node v in the SPDD, the method needs to know whether $H_v$ is colored by a single color and if yes, what color. This information may be obtained through an extension of the SPDD. In particular, the method may mark each node v in the SPDD with an additional field color. Assume that the decisions specified in the packet classifier are encoded as non-negative integers. If $H_v$ is colored by more than one color, the method assigns −1 to the color field of node v. Otherwise, the color field of node v is assigned the color that colors $H_v$. This additional information may be computed in a single bottom-up pass of the SPDD. The color field of each leaf node v is the same as its label F(v), which denotes a decision. If all the children of an internal node v have the same color value, node v is also assigned the same color value. Otherwise, the color field of node v is assigned −1.

According to the early detection techniques described above, the method explores the sub-tree $T_v$ rooted at a node v only if node v's color value is −1. This implies that the method can safely remove the descendents of a node v if v's color field value is not −1. That makes node v a leaf node and the method labels node v with its color value, which is the same as the decision of all the leaf descendants of node v. The trimming operation may also be done in a single bottom-up pass of the SPDD and may be implemented as a recursive function.

Figure 6:
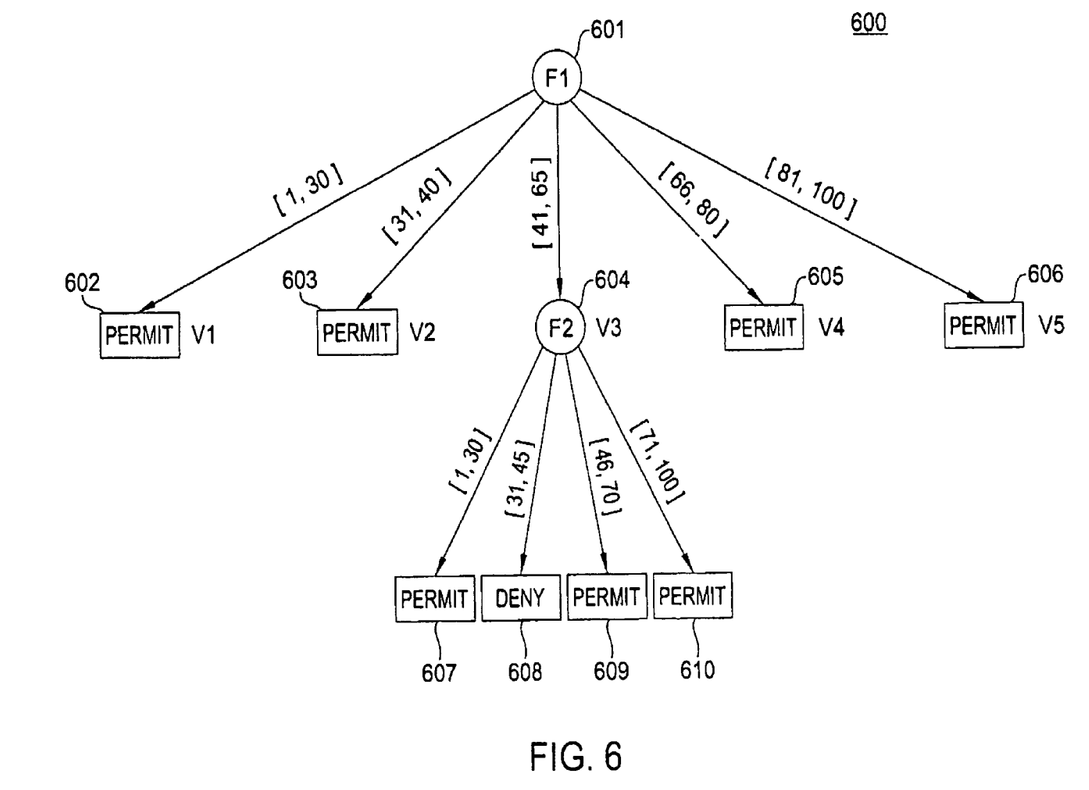
FIG. 6 illustrates the PPDD obtained by trimming the SPDD in FIG. 4.
Figure 7:
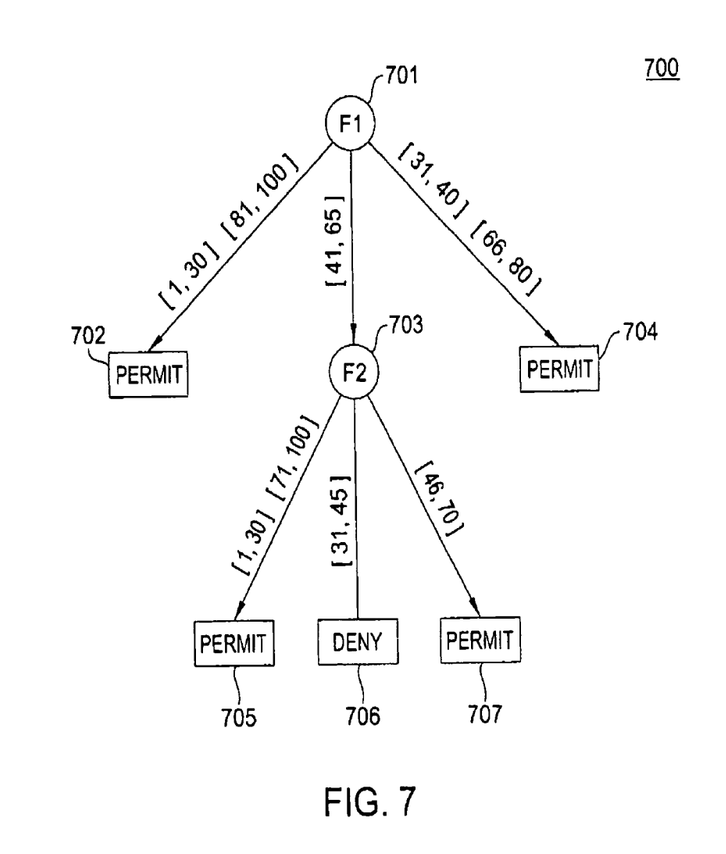
FIG. 7 illustrates the PPDD obtained by trimming the SPDD in FIG. 5.

Table-3 provides an exemplary algorithm for trimming an SPDD to a PPDD. FIG. 6 illustrates the PPDD obtained by trimming the SPDD in FIG. 4. Unlike the SPDD that contained 18 nodes, the PPDD contains the 10 nodes 601-610. FIG. 7 illustrates the PPDD obtained by trimming the SPDD in FIG. 5. The PPDD contains the 7 nodes 701-707.

TABLE 3

An Algorithm for Trimming an SPDD to a PPDD

```
IntSPDD2PPDD(noderoot)
If(root is a leaf node)
    root.color=root.label;
    return root.color;
prune=true;
color=∞;
for (each child of root)
    if (color==∞ )
        color = SPDD22PPDD(child);
        if (color== −1)
            prune=false;
        else if (color! = SPDD22PPDD(child))
            prune=false;
if !prune
    root.color = −1;
    return −1;
for (each child of root)
    dispose child;
root.color=color;
root.label=root.color;
return root.color;
```

Those skilled in the art would realize the SPDDs and PPDDs illustrated in FIGS. 4-7 may be further compressed by appropriate ordering of packet header fields. For example, the method may merge nodes $v_1$, $v_2$, $v_4$ and $v_5$ (shown as 401, 402, 404 and 405) into a single node in the SPDD in FIG. 4. In one embodiment, the current invention reduces the number of nodes by rearranging the packet header fields. In another embodiment, the current invention reduces the number of nodes of a PPDD by building the SPDD according to an appropriate ordering of the packet header fields. Notice that in the regular form of SPDD, the number of ranges is the same as the number of edges, which is the number of nodes minus one.

Figure 8:
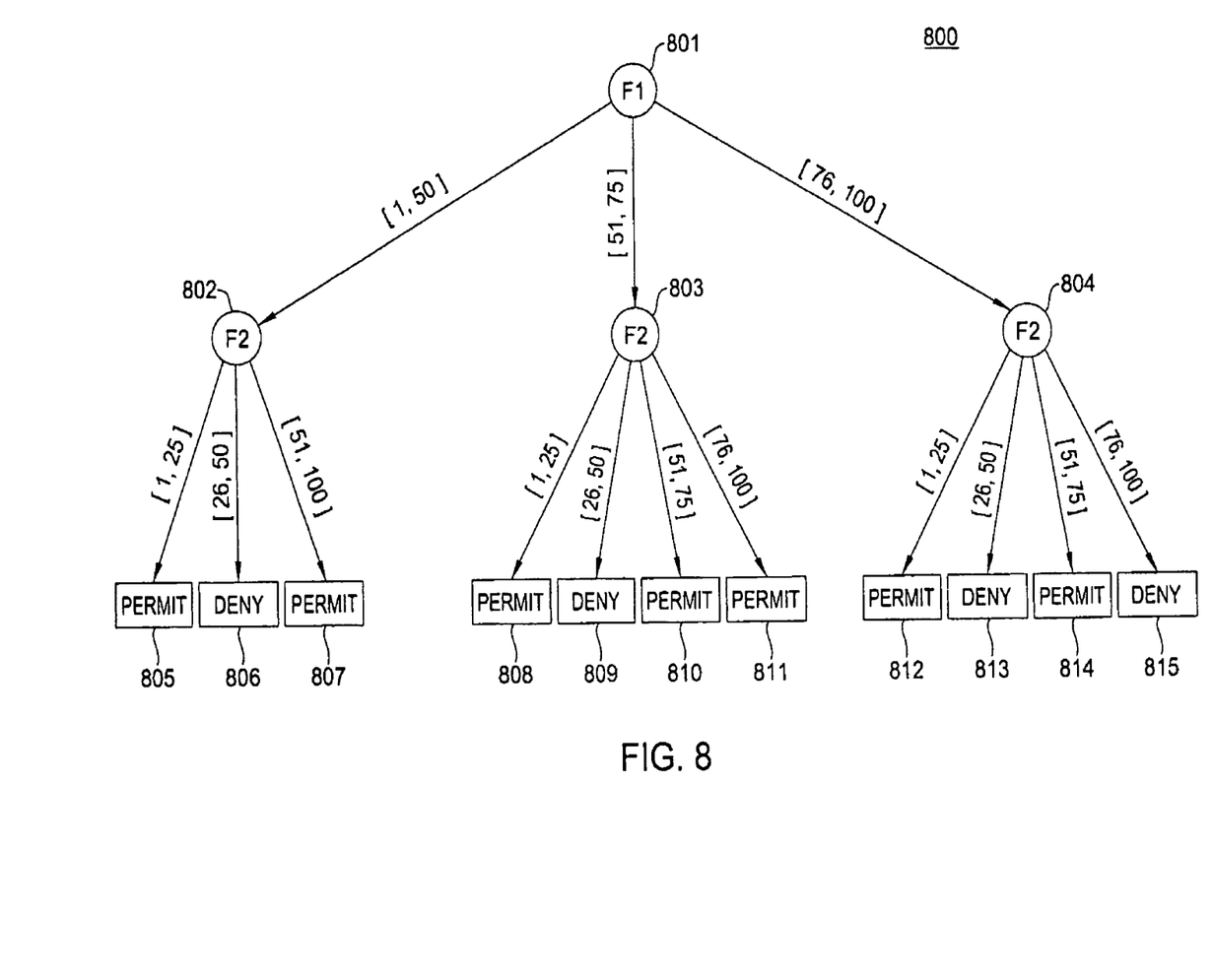
FIG. 8 illustrates rule set in Table-4 for the case when $F_1$ is used as the first dimension and $F_2$ is used as the second dimension.
Figure 9:
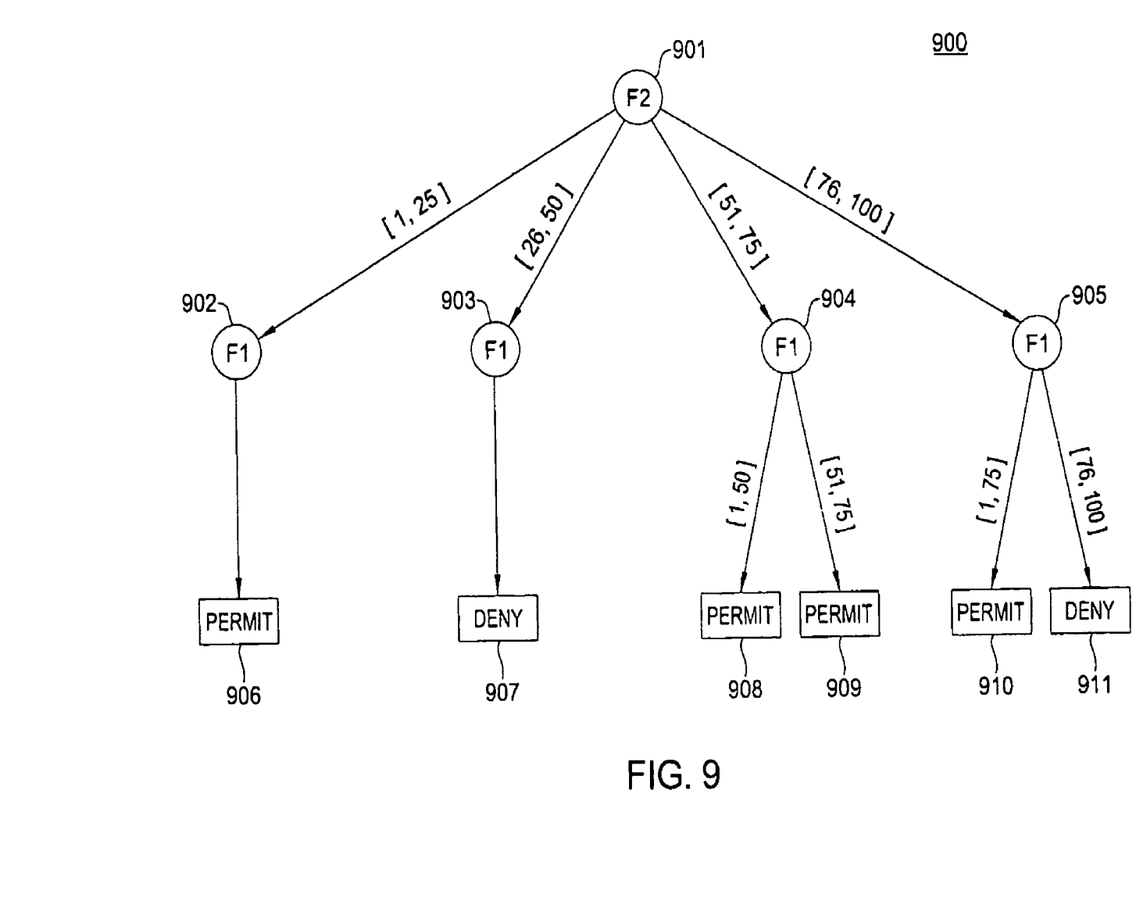
FIG. 9 illustrates rule set in Table-4 for the case when $F_2$ is used as the first dimension and $F_1$ is used as the second dimension.

For example, consider the rule set in Table-4. FIG. 8 illustrates rule set in Table-4 for the case when $F_1$ is used as the first dimension and $F_2$ is used as the second dimension. The resulting SPDD contains 15 nodes comprised of 801-815 as shown in FIG. 8. This SPDD cannot be pruned and hence the PPDD is of the same size. If the method switches the order of $F_1$ and $F_2$, the resulting SPDD contains 11 nodes. FIG. 9 illustrates the SPDD with 11 nodes 901-911 for the rule sets in Table-4. For this SPDD, $F_2$ is used as the first dimension and $F_1$ is used as the second dimension. By trimming the first four leaf nodes 906-909 in FIG. 9, a new PPDD that contains 7 nodes may be built.

TABLE 4

An exemplary rule set for appropriate order of fields

| | |
|---|---|
| $r_1$: | $(F_1 \in [1, 100]) \wedge (F_2 \in [1, 25]) \rightarrow$ permit |
| $r_2$: | $(F_1 \in [1, 100]) \wedge (F_2 \in [26, 50]) \rightarrow$ deny |
| $r_3$: | $(F_1 \in [51, 100]) \wedge (F_2 \in [51, 75]) \rightarrow$ permit |
| $r_4$: | $(F_1 \in [76, 100]) \wedge (F_2 \in [76, 100]) \rightarrow$ deny |
| $r_5$: | $(F_1 \in [1, 100]) \wedge (F_2 \in [1, 100]) \rightarrow$ permit |

Figure 10:
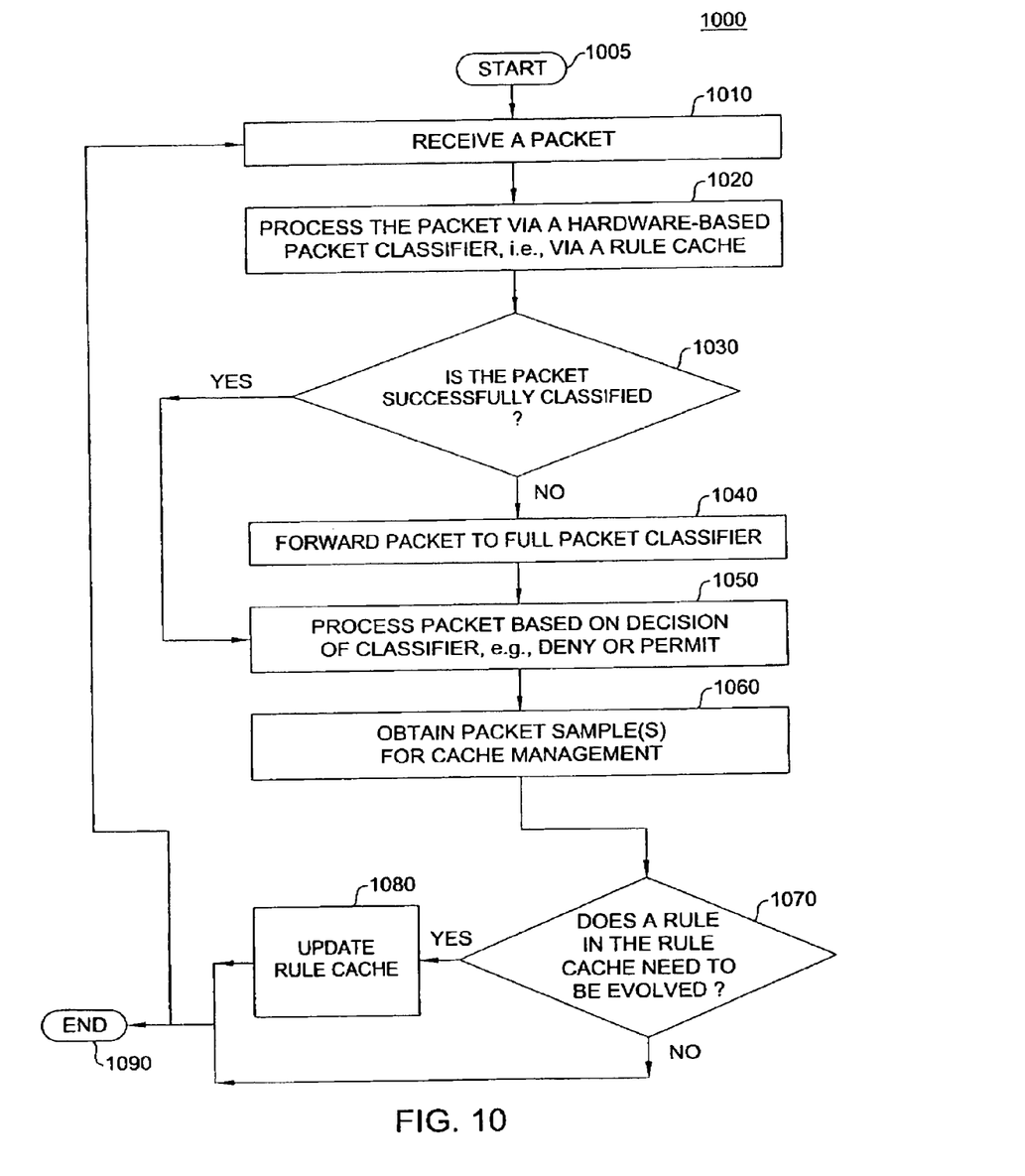
FIG. 10 illustrates an example of a method for classifying packets.

FIG. 10 illustrates a method 1000 for classifying packets, e.g., at wire-speed. In one embodiment, the current invention provides packet classification in a network device such as a router, a server, etc. The method deploys a hardware-based packet classifier, e.g., using a rule cache and a software-based packet classifier, e.g., a full rule set packet classification module. The content of the rule cache is managed by a cache manager based on characteristics of incoming packets and the content of the full rule set.

Method 1000 starts in step 1005 and proceeds to step 1010. In step 1010, method 1000 receives a packet. For example, a router receives a packet that needs to be classified. For example, the router may permit a packet to pass through the router to another device.

In step 1020, method 1000 processes the received packet through a hardware-based packet classifier, e.g., a wire speed packet classifier with a rule cache. For example, a hardware-based rule cache is used to classify the received packet.

In step 1030, method 1000 determines whether or not the packet is successfully classified by the hardware-based packet classifier. If the packet is successfully classified, the method proceeds to step 1050. Otherwise, the method proceeds to step 1040.

In step 1040, method 1000 forwards the unclassified packet to the software-based packet classifier, e.g., a full packet classification module or classifier. The full packet classifier has a default classification to ensure successful classification of all packets. The method then proceeds to step 1050.

In step 1050, method 1000 processes the classified packet based on the decision of the classifier. For the above example, a router may either permit or deny the packet from passing through a network. In one embodiment, the decisions for a classified packet (e.g., permit or deny by either the full packet classifier or the rules cache based classifier) are made by using a data structure such as a Standard Packet Decision Diagram or a Pruned Packet Decision Diagram.

In step 1060, method 1000 obtains packet sample(s) for cache management. For example, the cache manager periodically samples packets such that rules in the rule cache may be updated to reduce cache miss rate. In one embodiment, the current invention selects the sample packet(s) from packets that result in cache miss.

In step 1070, method 1000 determines whether or not one or more rules in the rule cache need to be evolved. For example, the cache manager uses the statistics of incoming traffic flows to determine if one or more rules should be switched into or out of the rule cache to minimize cache miss ratio. If one or more rules need to be evolved, the method proceeds to step 1080. Otherwise, the method proceeds to step 1090 to end processing the current packet or returns to step 1010 to receive another packet.

In step 1080, method 1000 updates the rule cache. For example, the method swaps one or more rules in the rule cache based on the traffic pattern. The method then proceeds to step 1090 to end processing the current packet or returns to step 1010 to continue receiving packets.

Figure 11:
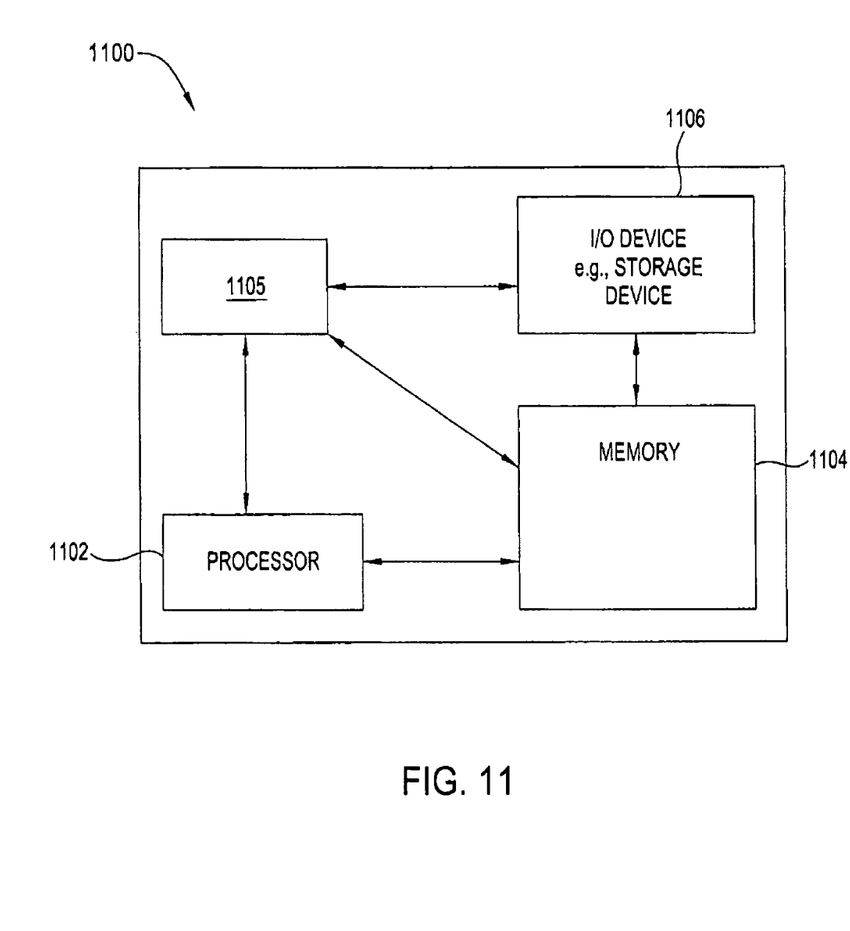
FIG. 11 illustrates a high level block diagram of a general purpose computer suitable for use in performing the functions described herein.

FIG. 11 depicts a high level block diagram of a general purpose computer suitable for use in performing the functions described herein. As depicted in FIG. 11, the system 1100 comprises a processor element 1102 (e.g., a CPU), a memory 1104, e.g., random access memory (RAM) and/or read only memory (ROM), a module 1105 for classifying packets, and various input/output devices 1106 (e.g., network interface cards, such as 10, 100, or Gigabit Ethernet NIC cards, Fibre Channel Host Bus Adapters, Infiniband adapters, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, or entirely in hardware, e.g., using application specific integrated circuits (ASIC), a general purpose computer or any other hardware equivalents. In one embodiment, the present module or process 1105 for classifying packets can be loaded into memory 1104 and executed by processor 1102 to implement the functions as discussed above. As such, the present method 1105 for classifying packets (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a packet, comprising:
   processing the packet through a hardware-based packet classifier having an evolving rule, wherein the evolving rule is updated periodically in accordance with sample packets that are obtained within a sampling time interval, wherein the evolving rule is for matching a plurality of received packets from different flows, wherein each of the different flows comprises packets with a same projection, wherein the hardware based packet classifier comprises a register for storing the evolving rule; and
   processing the packet by a processor of a software-based packet classifier when the hardware-based packet classifier is unable to classify the packet, wherein the software-based packet classifier comprises a plurality of rules associated with packet classification, wherein each rule of the plurality of rules comprises a predicate and an action, wherein each predicate comprises a plurality of literals defined over a plurality of packet header fields, wherein each literal comprises a range defined by at least two values of one of the plurality of packet header fields, wherein a rule of the plurality of rules is evaluated for a match to the packet when a predicate of the rule matches a projection of the packet, and wherein the evolving rule is derived from at least two of the plurality of rules.

2. The method of claim 1, wherein the sample packets comprise packets that are unable to be classified by the hardware-based packet classifier.

3. The method of claim 1, wherein the evolving rule is updated to minimize a cache miss ratio.

4. The method of claim 1, wherein the evolving rule is updated in accordance with a data structure having a plurality of evolving rules.

5. The method of claim 4, wherein the sample packets are evaluated to determine whether a new evolving rule needs to be created.

6. The method of claim 1, wherein the hardware-based packet classifier comprises a plurality of rules caches to allow hot-swapping between the plurality of rules caches.

7. A non-transitory computer-readable medium storing instructions which, when executed by a processor, cause the processor to perform operations for processing a packet, the operations comprising:

processing the packet through a software-based packet classifier, wherein the packet was previously processed through a hardware-based packet classifier having an evolving rule, wherein the evolving rule is updated periodically in accordance with sample packets that are obtained within a sampling time interval, wherein the evolving rule is for matching a plurality of received packets from different flows, wherein each of the different flows comprises packets with a same projection, wherein the hardware-based packet classifier comprises a register for storing the evolving rule, and wherein the hardware based packet classifier was unable to classify the packet, wherein the software-based packet classifier comprises a plurality of rules associated with packet classification, wherein each rule of the plurality of rules comprises a predicate and an action, wherein each predicate comprises a plurality of literals defined over a plurality of packet header fields, wherein each literal comprises a range defined by at least two values of one of the plurality of packet header fields, wherein a rule of the plurality of rules is evaluated for a match to the packet when a predicate of the rule matches a projection of the packet, and wherein the evolving rule is derived from at least two of the plurality of rules.

8. The non-transitory computer-readable medium of claim 7, wherein the sample packets comprise packets that are unable to be classified by the hardware-based packet classifier.

9. The non-transitory computer-readable medium of claim 7, wherein the evolving rule is updated to minimize a cache miss ratio.

10. The non-transitory computer-readable medium of claim 7, wherein the evolving rule is updated in accordance with a data structure having a plurality of evolving rules.

11. The non-transitory computer-readable medium of claim 10, wherein the sample packets are evaluated to determine whether a new evolving rule needs to be created.

12. The non-transitory computer-readable medium of claim 7, wherein the hardware-based packet classifier comprises a plurality of rules caches to allow hot-swapping between the plurality of rules caches.

13. A system for classifying a plurality of received packets, comprising:

a hardware-based packet classifier storing an evolving rule for classifying the plurality of received packets, wherein the evolving rule is updated periodically in accordance with sample packets that are obtained within a sampling time interval, wherein the evolving rule is for matching a plurality of received packets from different flows, wherein each of the different flows comprises packets with a same projection, wherein the hardware-based packet classifier comprises a register for storing the evolving rule; and a processor and a computer-readable medium in communication with the processor, the computer-readable medium storing instructions which, when executed by the processor, cause the processor to implement a software-based packet classifier for processing any packets of the plurality of received packets that are unable to be classified by the hardware-based packet classifier, wherein the software-based packet classifier comprises a plurality of rules associated with packet classification, wherein each rule of the plurality of rules comprises a predicate and an action, wherein each predicate comprises a plurality of literals defined over a plurality of packet header fields, wherein each literal comprises a range defined by at least two values of one of the plurality of packet header fields, wherein a rule of the plurality of rules is evaluated for a match to the packet when a predicate of the rule matches a projection of the packet, and wherein the evolving rule is derived from at least two of the plurality of rules.

* * * * *